Dec. 21, 1937.   H. J. HASBROUCK, JR   2,102,895
MEANS FOR DRIVING AND GUIDING FILM
Filed June 27, 1935
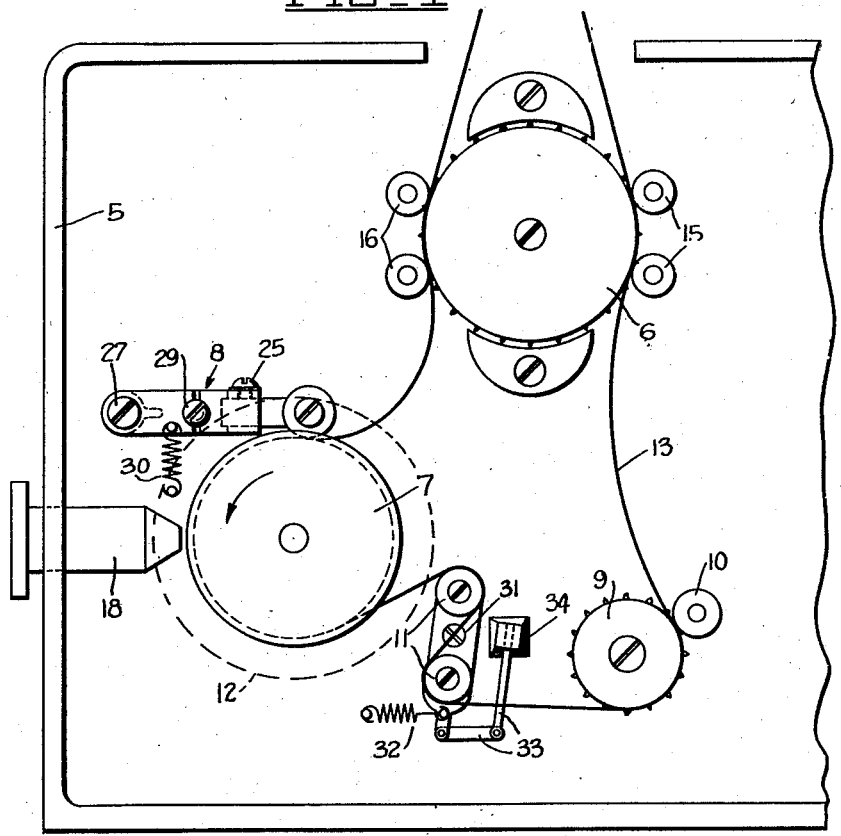
FIG_1
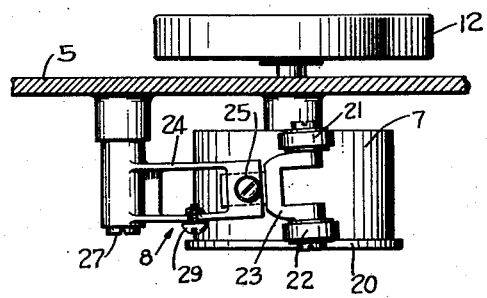
FIG_2
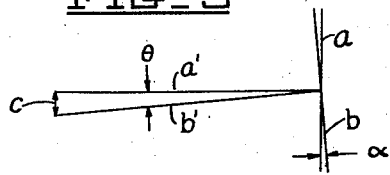
FIG_3
INVENTOR
Harold J. Hasbrouck, Jr.
BY
ATTORNEY Patented Dec. 21, 1937

2,102,895

UNITED STATES PATENT OFFICE 2,102,895

MEANS FOR DRIVING AND GUIDING FILM

Harold J. Hasbrouck, Jr., Flushing, N. Y., assignor to United Research Corporation, Long Island City, N. Y., a corporation of Delaware Application June 27, 1935, Serial No. 28,648

4 Claims. (Cl. 271—2.3)

This invention relates to the driving or advancement of film through talking motion picture apparatus, and particularly to means for guiding or steering the film past a translation point in sound or film recording and reproducing units. In recording sound on film, a beam of light either varying in position or intensity with sound waves to be recorded is impressed upon a narrow longitudinal portion of the film intermediate one row of sprocket teeth perforations and the picture frames. In sound reproduction, a beam of light of constant intensity is projected through the sound track portion just mentioned, the emergent light being modulated by the sound track for impression upon a light sensitive device.

An object of this invention is to maintain the sound track portion of the film at a constant position with respect to the modulated recording beam or the constant intensity reproducing beam. This object is accomplished by maintaining one edge of the film always against either a moving or fixed guide of the sound head reproducing unit at or adjacent the point of translation. Film instability was experienced in the early sound on film drive mechanisms where the film was passed over a drum or between rollers, and it was found that the film could be given a certain stiffness by producing "kinks" or transverse curvatures therein. Reference is hereby made to an article starting on page 653 of the Journal of the Society of Motion Picture Engineers for November 1930, in which the difficulties relating to film drive are discussed.

The present invention accomplishes film guiding or the maintaining of one film edge against a guide flange by producing a force at right angles to the direction of motion of the film, this force being derived from the driving force imparted to the film. In other words, a frictional component is introduced which tends to force the film at right angles to its direction of travel. The mechanism for so doing is a pressure roller whose axis has an abaxial relationship with respect to the axis of the rollers with which it is associated. This tilt of the axis is in a plane parallel to the plane of film movement which plane is perpendicular to a plane including the axis of the roller over which the film is passing. The film will be guided to the side of the roller which has the end of the roller in advance. Reference is hereby made to Kellogg Patent No. 2,012,130 of August 20, 1935, directed to a system for obtaining film guiding in the manner described above, the present invention being an improvement on the means shown therein for adjusting and controlling the adjustment of the abaxial relationship between the axes of the rollers between which the film passes.

The invention has been disclosed embodied in a sound recording unit and will be more fully understood by reference to the following detailed description read in conjunction with the accompanying drawing, in which—

Fig. 1 is a diagrammatic drawing of film driving mechanism embodying the invention.

Fig. 2 is a detail view of the cooperating rollers which guide the film; and

Fig. 3 is a diagram to represent the forces acting upon the film when intermediate the rollers.

Referring now to Fig. 1, a casing 5 of a sound unit encloses a feed sprocket 6, a flywheel roller 7 with its associated flywheel 12, a pressure guide roller assembly 8, a drive sprocket 9 with its associate pad roller 10, and stabilizing rollers 11, all of which advance and guide a film 13 through the sound recording unit. The feed sprocket 6 has pad rollers 15 and 16 associated therewith. An objective lens unit 18 positioned in one wall of the casing 5 projects a beam of light which is modulated in accordance with the sound being recorded by any of the well known mechanisms (not shown) upon the sound track portion of the film 13 as it passes over the roller 7.

Referring now to Fig. 2, it will be noted that the roller 7 has a guide flange 20 on one side thereof against which the film is maintained by rollers 21 and 22. Rollers 21 and 22 are mounted on a yoke 23 retained on a frame 24 by a screw 25. The other end of the frame 24 is pivoted upon a shaft 27 connected to the wall of the casing 5. The frame 24 has one split leg which has been tapped for a tapered screw 29, the position of this screw varying the axis of the rollers 21 and 22 with respect to the axis of roller 7. This adjustment has been somewhat exaggerated in Fig. 2 to clearly show the abaxial relationship between the axis of the rollers 21 and 22 and the axis of roller 7. The rollers exert a certain pressure on the film caused by a tension spring 30 connected between the casing 5 and the frame 24 (see Fig. 1).

The film progresses between the rollers 21, 22 and roller 7, as shown by the arrow on roller 7. The roller 7 is provided with stability of rotation by the inertia of the flywheel 12. To aid in obtaining velocity stability, tension rollers 11 are mounted on a frame pivoted at 31 which maintains the film under a predetermined tension by the action of a coil spring 32. To dampen out any resonance of this resilient mechanism, a damping connection is made through lever arms 33 to a block of synthetic rubber 34 attached to the back wall of casing 5 and one of the arms 33. This synthetic rubber has had ingredients added thereto which increase its mechanical resistance and cause it to have a slower period of recovery.

To further illustrate the forces applied to the film to maintain it upon the drum 7 and one edge thereof against the flange 20, within certain limits of variation, reference is made to Fig. 3 in which line $a$ may represent the position of the axis of rotation of roller 7 and perpendicular to which has been drawn line $a'$ of a certain length. The length of line $a'$ may represent the force or energy which propels the film in the direction of the arrow in Fig. 1. The line $b$ represents the position of the axis of rotation of the rollers 21 and 22 and line $b'$ which has been drawn perpendicular thereto from the intersection of line $a$ and line $a'$, may represent the total force applied to the film. The angle alpha ($\alpha$) represents the angle between the two axes or the abaxial relationship between these axes, and is equal to the angle theta ($\theta$) between the lines $a'$ and $b'$. Due to the tendency of the rollers 21 and 22 to provide the film with a transverse movement, we have a component of energy which may be represented by the length of the double headed arrow $c$ which is drawn perpendicular to the line $a'$. This arrow may represent force or energy and if the film edge is not already adjacent the flange 20, this energy is expended in moving the film against the flange and keeping it there. The film will always be guided in the direction of the advanced roller. If the flange is positioned on the other side of roller 7, then the axis of rollers 21, 22 is tilted in the opposite direction. A single roller will also function in like manner, the film being urged toward the advanced edge. Furthermore, in the present instance each roller could be tilted individually similarly to automobile steering and the film be guided according to the invention. Of course, the sound track portion is positioned near the guide flange to minimize shrinkage.

Although the invention has been disclosed embodied in a sound recording unit, it is to be understood that it is also applicable to any film driving mechanism, such as sound reproducers and printers, where it is desired to maintain one edge of the film along a guide for positioning any particular part thereof with respect to an associated non-moving element.

What is claimed is:

1. In a film guiding mechanism, the combination of a roller over which film is adapted to be advanced, a guide flange on one edge of said roller, a plurality of pressure rollers adapted to press said film solely at the edges thereof against said first mentioned roller, a bracket having axles at the ends thereof for mounting said pressure rollers, a hollow framework having one arm thereof divided into separate portions for mounting said bracket, and means for varying the axis of rotation of said pressure rollers with respect to the axis of rotation of said first roller.

2. A film driving mechanism in accordance with claim 1 in which said adjusting means comprises a tapered screw adapted to vary the distance of separation between portions of said divided arm of the mounting frame of said pressure rollers, said pressure rollers being rotatable at the ends of said bracket.

3. In a film guiding mechanism, the combination of a roller over which film is adapted to be advanced, a plurality of rotating means for exerting pressure solely along the edges of said film in contact with said roller, a framework having parallel arms adapted to support said means at one end thereof and adapted to be pivoted at the other end thereof, one of said arms being separated into two portions, and means intermediate and contacting the ends of said portions for bending the other arm of said framework to change the axis of rotation of said rotating means.

4. In a film guiding mechanism, the combination of a roller having a width substantially comparable to the width of film adapted to be advanced thereover and a fixed axis of rotation, a pair of rotatable rollers each having a width comparable to the edges of the film having no images thereon, means for mounting said rollers for exerting pressure on said film at said portions having no images thereon and against said first roller, and positive vernier means for adjusting the axes of rotation of said rollers with respect to the axis of rotation of said first roller.

HAROLD J. HASBROUCK, Jr.